(12) United States Patent
Sobie et al.

(10) Patent No.: US 11,600,163 B2
(45) Date of Patent: Mar. 7, 2023

(54) KEY RETURN PORTAL

(71) Applicants: Robert Sobie, San Diego, CA (US); Graham Ross, Oceanside, CA (US)

(72) Inventors: Robert Sobie, San Diego, CA (US); Graham Ross, Oceanside, CA (US)

( * ) Notice: Subject to any disclaimer, the term of this patent is extended or adjusted under 35 U.S.C. 154(b) by 0 days.

(21) Appl. No.: 16/809,115

(22) Filed: Mar. 4, 2020

(65) Prior Publication Data
US 2020/0286363 A1    Sep. 10, 2020

Related U.S. Application Data

(60) Provisional application No. 62/815,010, filed on Mar. 7, 2019.

(51) Int. Cl.
| | |
|---|---|
| *G06K 7/08* | (2006.01) |
| *G08B 21/24* | (2006.01) |
| *G06K 7/10* | (2006.01) |
| *G06Q 30/0645* | (2023.01) |

(52) U.S. Cl.
CPC ......... *G08B 21/24* (2013.01); *G06K 7/10297* (2013.01); *G06K 2007/10504* (2013.01); *G06Q 30/0645* (2013.01)

(58) Field of Classification Search
CPC ...... G06Q 10/02; G06Q 10/087; G06Q 50/10; G07C 205/02; G07C 5/008
USPC ............................. 235/451, 462.46, 472.02
See application file for complete search history.

(56) References Cited

U.S. PATENT DOCUMENTS

| | | | | |
|---|---|---|---|---|
| 6,006,148 | A * | 12/1999 | Strong | G07B 15/00 701/32.3 |
| 6,681,987 | B1 * | 1/2004 | Ford | B60R 25/04 235/380 |
| 7,188,070 | B2 * | 3/2007 | Dar | G06Q 20/127 705/13 |
| 8,868,288 | B2 * | 10/2014 | Plante | G07C 5/008 701/32.2 |
| 8,907,816 | B2 * | 12/2014 | Ramseyer | G07C 5/008 340/933 |
| 10,878,646 | B2 * | 12/2020 | Plante | G07C 5/085 |
| 2009/0212978 | A1 * | 8/2009 | Ramseyer | G06Q 10/087 340/989 |

* cited by examiner

*Primary Examiner* — Daniel St. Cyr

(57) ABSTRACT

Methods and apparatus for detecting the retention of a car key by a customer after return of a rental car are disclosed. A plurality of RFID tags having a common identifier are attached to the rental car keys. The shuttle bus or other facility exit is equipped with a detection portal configured to detect a RFID tag having the common identifier and provide a signal upon detection of the RFID tag to a monitor that provides an alert upon receipt of the signal.

12 Claims, 6 Drawing Sheets

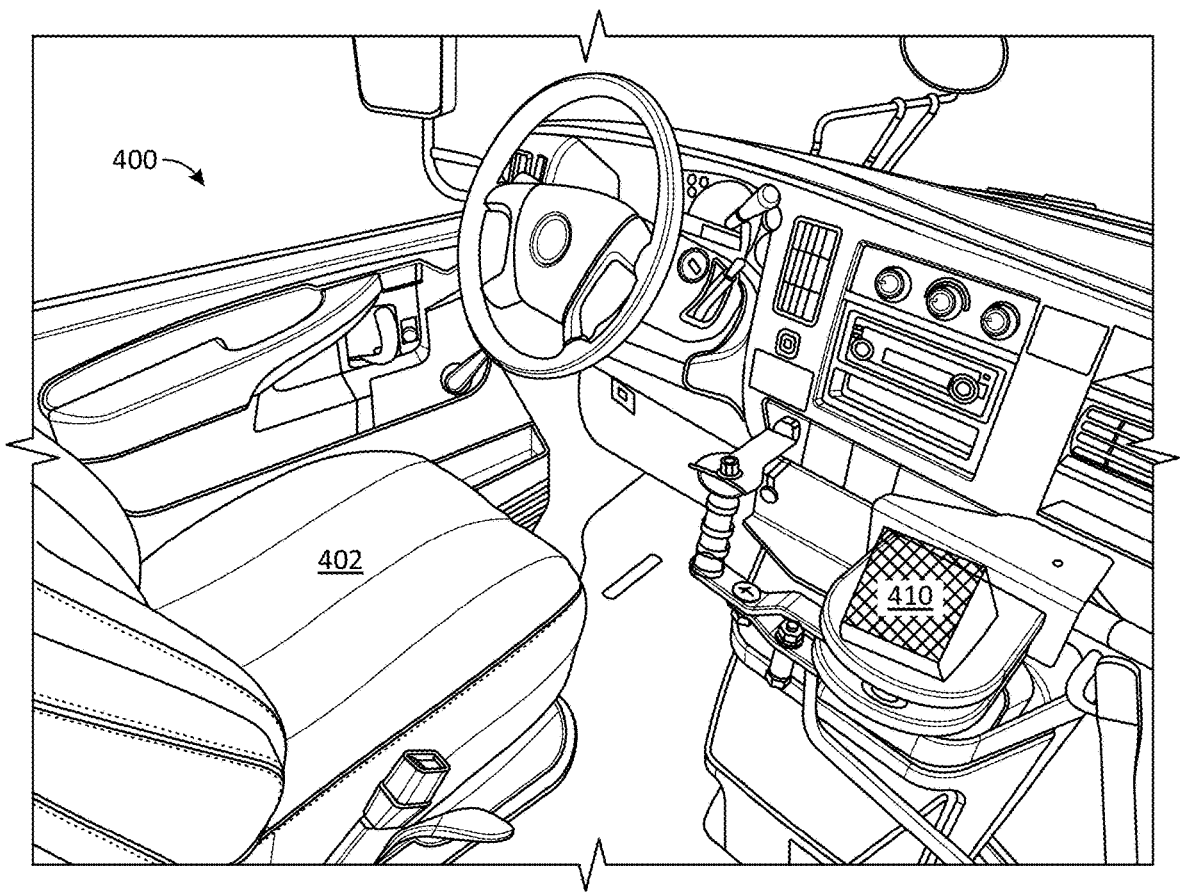
Figure 4A
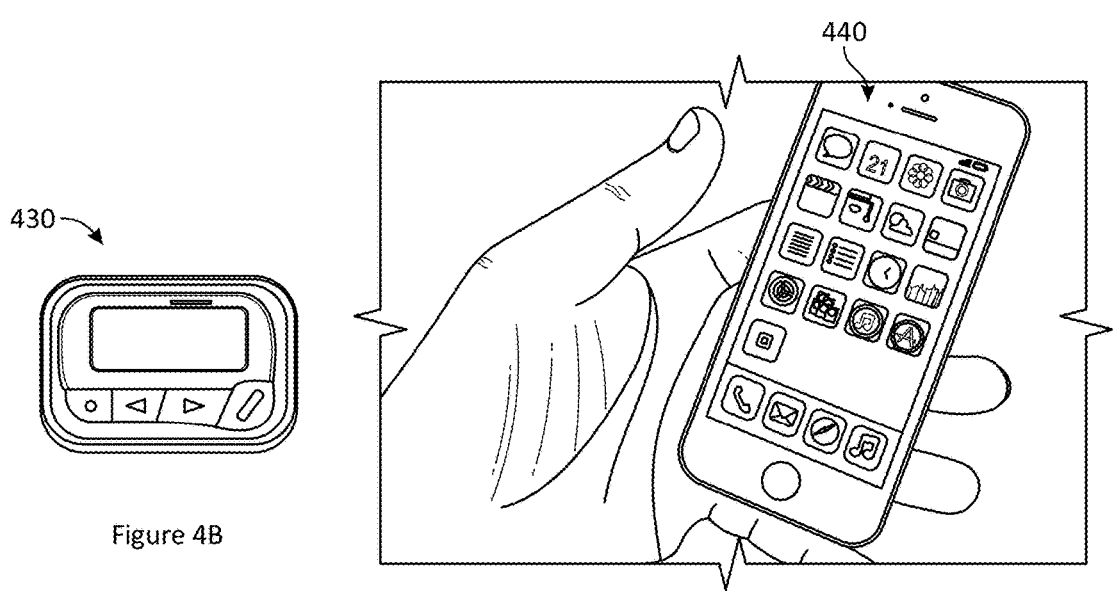
Figure 4B
Figure 4C

KEY RETURN PORTAL

CROSS-REFERENCE TO RELATED APPLICATIONS

This application claims priority to provisional application 62/815,010 filed Mar. 7, 2019, which is incorporated herein in its entirety by reference.

STATEMENT REGARDING FEDERALLY SPONSORED RESEARCH OR DEVELOPMENT

Not applicable.

BACKGROUND

Field

The present invention generally relates to detecting the presence of a Radio Frequency Identification (RFID) tag that is attached to an item to be tracked.

Description of the Related Art

Rental car companies at major airports deal with a large, continuing flow of cars through their return facility. The area available for customers to drop off their car to be returned is often limited. Smooth operation of the rental car return facility is based on quickly moving cars out of the drop-off area after the car is checked in, for example to a processing area for cleaning and refueling in preparation for the next rental.

As important as speed is to the rental car agencies, it is equally important to the renter, who is often traveling on business trying to catch a flight or with family trying to move efficiently between the rental car agency and the check in counter at the airport. Customers who are in a rush will sometimes forget to leave the keys to their rental car with the rental car. When a customer forgets to leave the keys in the rental car, the car cannot be moved by the staff. Not only does this stop the rental car turnover process, but it also blocks a portion of the drop-off area and can block the movement of other vehicles. Car rental companies make every attempt to remind customers to leave the keys in the car and remind the customers at multiple points along their departure path through the return facility and on the shuttle buses to leave their keys. It is still common for customers to inadvertently retain their keys when they exit the rental car and leave the rental car return facility. This problem is increased by the trend of modern cars toward remote keys that can be left in a customer's pocket or purse while using the rental car. When a car is found stranded in the rental car return area without keys, it causes multiple staff to run around searching for the customer and to call the drivers of the shuttle buses in an attempt to try and find the driver of the stranded car and retrieve the mistakenly taken keys. Each incident incurs a cost to the car rental company in the form of lost staff time and degrades the experience of the customers, who may not be able to drop off their car because of the blockage in the drop-off area. Unrecovered keys require specialty replacement, adding expense to the rental car agency which is often passed on to the customer who may realize only when it is too late that they have the keys still in their possession.

RFID tags and readers, also known as detectors, are a known technology that may use one or more frequencies and active or passive devices. Current practice is to assign a unique identifier to each RFID tag and associate that unique identifier with a single item or type of item. This enables tracking of individual items or types of items within a facility. This type of tracking system is expensive, as each RFID tag must be individually programmed, as well as complex to use and maintain, as the association of the specific RFID identifier with a specific item must be tracked in an information system and verified against that system each time an RFID tag is attached to one of those items.

SUMMARY

What is needed is a simple and adaptable method and apparatus for detecting that any set of keys that is retained by a customer after dropping off a rental car. The invention described herein fulfills this need.

In an aspect, the present disclosure provides for, and includes, an apparatus for ensuring that a rental car key is not retained by a customer. The apparatus includes a first plurality of Radio Frequency Identification (RFID) tags configured to be respectively attached to a plurality of rental car keys, each RFID tag having a common first identifier, a detection portal configured to detect a RFID tag having the first identifier and provide a first signal when a RFID tag having the first identifier has been detected, and a monitor configured to receive the first signal and provide an alert upon receipt of the first signal.

In an aspect, the present disclosure provides for, and includes, a system for use at a rental car facility. The system includes a first plurality of RFID tags that are configured to be respectively coupled to a first plurality of rental car keys in use at the rental car facility. All of the first plurality of RFID tags have a common identifier. The system also includes a second plurality of detection portals individually coupled to a second plurality of shuttle buses. Each detection portal is configured to detect an RFID tag that is on the shuttle bus and provide a signal that a rental car key has been detected. The system also includes a second plurality of monitors respectively disposed within the second plurality of the shuttle buses, wherein each monitor is configured to receive the signal from the detection portal on the same shuttle bus and provide an alert upon receipt of the signal.

In an aspect, the present disclosure provides for, and includes, a method of preventing customers from retaining rental car keys when returning a car to a rental car facility. The method includes the steps of attaching an RFID tag to a rental car key in use that that facility and installing a detection portal on a shuttle bus that is used to transport customers from the rental car facility. The detection portal is configured to detect the RFID tag and, upon such detection, provide a signal that the rental car key is on the shuttle bus. The method also includes the step of carrying a monitor that is configured to receive the signal and provide an alert upon receipt of the signal. The method also includes the step of asking customers on the shuttle bus to check whether they have the rental car key in their possession when the alert is provided.

The disclosed invention is simpler and less costly to implement than traditional RFID systems, because the RFID tags are simpler and less expensive and the deployment process is simpler and less time-consuming, yet the system provides everything needed to prevent car keys from being removed from a rental fa return facility. Implementation of this system may save hundreds of dollars per incident avoided and improve the customer experience for the business travelers who are the lifeblood of the car rental business at airports.

BRIEF DESCRIPTION OF THE DRAWINGS

Aspects of the disclosure are herein described, by way of example only, with reference to the accompanying drawings. With specific reference now to the drawings in detail, it is stressed that the particulars shown are by way of example and are for purposes of illustrative discussion of aspects of the disclosure. The description and the drawings, considered alone and together, make apparent to those skilled in the art how aspects of the disclosure may be practiced.

FIG. 4A depicts an exemplary monitor disposed proximate to a shuttle bus driver's seat, according to certain aspects of the present disclosure.

FIGS. 4B-4C depicts other embodiments of monitors, according to certain aspects of the present disclosure.

DETAILED DESCRIPTION

Figure 1A:
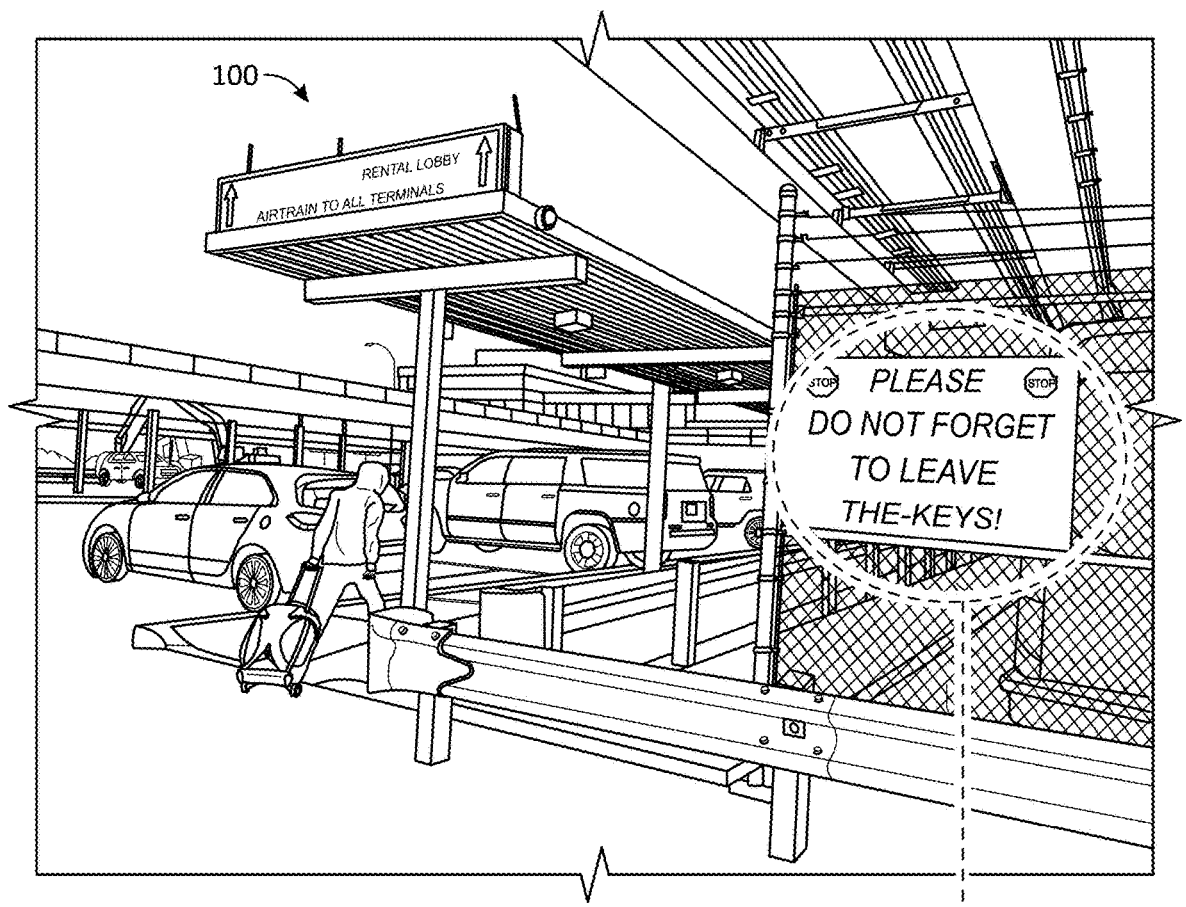
FIG. 1A depicts an example reminder sign at a car rental drop off facility.

This description is intended to illustrate some particular embodiments of the disclosure and not to exhaustively specify all permutations, combinations and variations thereof. Features illustrated with respect to one embodiment may be incorporated into other embodiment, and features illustrated with respect to a particular embodiment may be deleted from that embodiment. In addition, numerous variations and additions to the various embodiments suggested herein will be apparent to those skilled in the art in light of the instant disclosure and do not depart from the instant disclosure. In some instances, well-known structures, interfaces, and processes have not been shown in detail in order not to unnecessarily obscure the invention. It is intended that no part of this specification be construed to effect a disavowal of any part of the full scope of the invention.

Unless otherwise defined herein, all technical and scientific terms used herein have the same meaning as commonly understood by one of ordinary skill in the art to which this disclosure belongs. The terminology used in the description of the disclosure herein is for the purpose of describing particular aspects or embodiments only and is not intended to be limiting of the disclosure. References to techniques employed herein are intended to refer to the techniques as commonly understood in the art, including variations on those techniques or substitutions of equivalent techniques that would be apparent to one of skill in the art.

Unless the context indicates otherwise, it is specifically intended that the various features of the disclosure described herein can be used in any combination. Moreover, the present disclosure also contemplates that in some embodiments of the disclosure, any feature or combination of features set forth herein can be excluded or omitted.

The methods disclosed herein comprise one or more steps or actions for achieving the described method. The method steps and/or actions may be interchanged with one another without departing from the scope of the present disclosure. In other words, unless a specific order of steps or actions is required for proper operation of the embodiment, the order and/or use of specific steps and/or actions may be modified without departing from the scope of the present disclosure.

As used in the description of the disclosure and the appended claims, the singular forms "a," "an" and "the" and the like are intended to include to be interpreted as equivalent to the phrase "at least one" and comprise the plural forms as well, unless the context clearly indicates otherwise. Reference to an element in the singular is not intended to mean "one and only one" unless specifically so stated.

As used in the description of the disclosure and the appended claims, pronouns in the masculine (e.g., his) include the feminine and neuter gender (e.g., her and its) equivalent and vice versa.

As used herein, "and/or" refers to and encompasses any and all possible combinations of one or more of the associated listed items as well as singular usage of each item.

As used in the description of the disclosure and the appended claims, terms such as "top," "bottom," "upper," "lower," "left," "right," "front," "rear," and the like should be understood as referring to an arbitrary frame of reference. Thus, a top surface may extend upwardly, downwardly, diagonally, or horizontally in a particular embodiment without limiting the orientation in other embodiments.

As used herein, the terms "aspect" and "embodiment" are used to identify examples as to how the disclosure may be utilized and do not necessarily identify features or components that essential to the subject technology or that apply to all configurations of the subject disclosure. A disclosure relating to an aspect may apply to all configurations, or one or more configurations.

As used herein, the term "exemplary" means "serving as an example or illustration." Any aspect or design described herein as "exemplary" is not necessarily to be construed as preferred or advantageous over other aspects or designs.

The terms "about" and "approximately" as used herein when referring to a measurable value such as a length, a frequency, or a position and the like, is meant to encompass variations of ±20%, ±10%, ±5%, ±1%, ±0.5%, or even ±0.1% of the specified amount.

As used herein, the terms "include," "contain," "has," "have," and the like are intended to be inclusive in a manner similar to the term "comprise" as interpreted when employed as a transitional word in a claim.

As used herein, phrases such as "between X and Y" and "between about X and Y" should be interpreted to include X and Y. As used herein, phrases such as "between about X and Y" mean "between about X and about Y" and phrases such as "from about X to Y" mean "from about X to about Y."

Although the relationships among various components are described herein and/or are illustrated as being orthogonal or perpendicular, those components can be arranged in other configurations in some embodiments. For example, the angles formed between the referenced components can be greater or less than 90 degrees in some embodiments.

Although various components are illustrated as being flat and/or straight, those components can have other embodiments such as curved or tapered.

Headings and subheadings, if any, are used for convenience only and do not limit the invention.

As used herein, the term "car" comprises transportation vehicles of any type, size, or configuration. This includes, but is not limited to, automobiles, vans, sports utility vehicles (SUVs), trucks, boats, and aircraft.

As used herein, the phrase "car rental facility" includes a portion or all of the areas, offices, and equipment used by a company to rent, manage, and/or accept return of cars, regardless of how the use of the car is arranged between the company and the customer.

As used herein, the term "identifier" comprises a string of characters that can be digitally retrieved from an RFID tag by interrogation by an external device. The string of characters may include one or more of numbers, letters, and other symbols. The string of characters may comprise elements or structure to encode or encrypt the string of characters. The identifier may be an analog effect on to an applied external electromagnetic field, wherein the identifier is produced by the construction of the RFID tag and the effect is detected by the device generating the applied external electromagnetic field.

As used herein, the term "key" comprises a device that interacts with a car to enable operation of a car. The key may comprise mechanical features such as grooves, notches, depressions, or other features that can be configured to be paired with a mechanical lock such that the lock can only be opened by the paired key. The key may comprise a wireless device that communicates with the car and provides information to the car such that the car will operate only when the information received from the key matches stored information. In an aspect, a key may comprise any object that enables operation of a mechanism, wherein the mechanism may be any device that performs a function, for example a computer or a door. In an aspect, a key may be functional by itself, for example a badge that identifies a person and/or specific privileges of the person that possesses the key.

As used herein, the term "portal" comprises both openings through which people and/or object may pass as well as points that have a zone of coverage. A zone of coverage may be defined by a structure, such as the shell of a shuttle bus, or by a distance from the point. A portal may be configured to interact with a wireless device as the device passes through the portal or when the device is within the zone of coverage.

As used herein, the term "method" comprises a set of activities, e.g. steps in a process. In certain embodiments, the steps must be performed in a particular order while, in other embodiments, the sequence of activities may be interchanged. The term "method" is considered equivalent to and interchangeable with "process." In certain embodiments, one or more disclosed steps are omitted.

As used herein, the term "carrying" comprises all means of maintaining an item in proximity to a person, including carrying the item on the person or in a bag carried by the person, installing an item semi-permanently or permanently proximate to a location where that person routinely is located, or having the item included as a function of a second item, for example as an application running on a personal computer used by the person.

FIG. 1A depicts an example reminder sign 102 at a car rental drop off facility 100. Car rental companies make a diligent effort to remind customers to return their keys but rely on the customer to take action. It is a continuing a regular occurrent to have a customer retain the keys to their rental car after dropping it off at the car rental return facility.

Figure 1B:
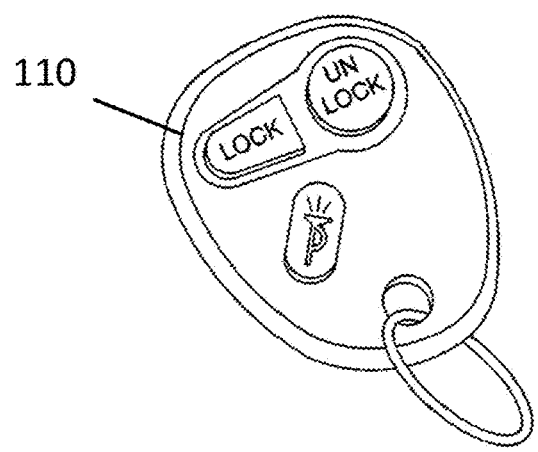
FIG. 1B depicts an example wireless ignition key that does not need to be inserted in a ignition lock to start and operate a car.

FIG. 1B depicts an example wireless ignition key 110 that does not need to be inserted in an ignition lock to start and operate a car. This type of key enables the car to be started and operated while the key 110 remains in the pocket or purse of the driver. This type of key increased the likelihood of the customer forgetting to return the key 110 when they drop off the car.

Figure 2:
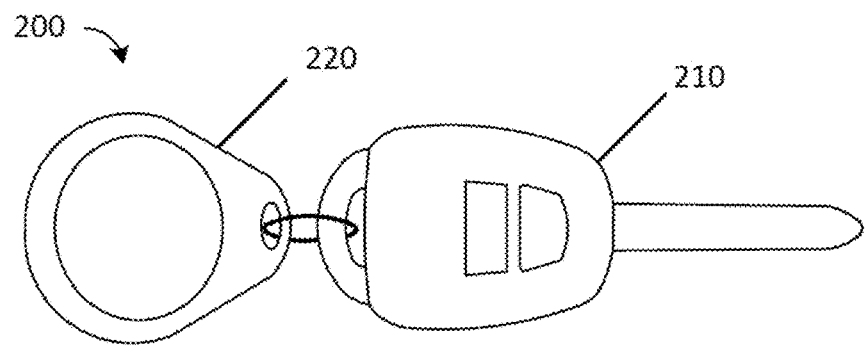
FIG. 2 depicts an exemplary tagged car key, according to certain aspects of the present disclosure.

FIG. 2 depicts an exemplary tagged car key 200, according to certain aspects of the present disclosure. A RFID tag 220 is coupled to a standard key 210 to a rental car, which may be a conventional mechanical key, a "smart" key having an embedded RFID tag that communicates with the car, or a completely wireless key fob, such as the key fob 110 of FIG. 1B.

RFID tags are a known technology wherein a RFID tag comprises an RF antenna circuit connected to an antenna tuned to one or more radio frequency bands and a detection scanner, or portal, that broadcasts a RF field within one of those bands. The RFID tag responds to the presence of the RF field by altering the characteristics of the antenna circuit in a way that affects the field in a way that can be detected by the detection scanner. The RFID tag may alter the characteristics in a way that conveys a binary code or identifier to the detection scanner and constitutes detection of the RFID tag 220 by the detection scanner. This identifier can be translated into an alphanumeric code. Receipt of the RFID tag identifier and comparison to one or more reference identifiers allows identification of the RFID tag 220 as associated with an item, a group, or a firm.

RFID tags commonly have a unique identifier assigned to each RFID tag. For example, the RFID tag in a car's smart key has a unique identifier and the car that it operates is programmed to operate only when a key with that specific identifier is inserted into the ignition lock. Managing this unique identifier in a secure fashion is a huge task and, consequently, it is a complicated process to replace a smart key for a particular car. Pairing the unique identifiers of RFID tags to the items to which the RFID tag is attached is a huge, complex, and time-consuming task.

A large car rental facility at a major airport may have hundreds or even thousands of cars in the active fleet. There is a constant turnover of the fleet as new cars are purchased and older cars are removed from service as well as migration of cars between sites. Maintaining these pairing records of cars and unique identifiers in the course of managing an ever-changing fleet of cars is difficult and costly.

In the instant invention, the RFID tags 220 all have a common identifier. In other embodiments, the RFID tags 220 have individual identifiers that comprise a common identifier. There is no intent to track or identify an individual set of keys. The only intent is to determine that a tagged car key 200 has been detected in an area where it should not be. This concept can be applied to any item that is restricted to an intended area, wherein detection of that item outside the intended area is cause for action.

In certain embodiments, the RFID tags 220 each respond to interrogation by a detection scanner in a way that conveys the identifier of that RFID tag 220 to the detection scanner.

In certain embodiments, different identifiers are assigned to different groups of items. For example, a first identifier is assigned to a first car company and is programmed into the RFID tags 220 that are attached to the keys of the fleet of vehicles owned by that company, while a second identifier, different from the first identifier, is assigned to a second car rental company and programmed into the RFID tags 220 that are attached to the keys to the vehicle of the second car company. This enables the bus driver to ask passengers if they rented from a particular car rental company, which may assist in passengers cooperating to find the keys.

Figure 3A:
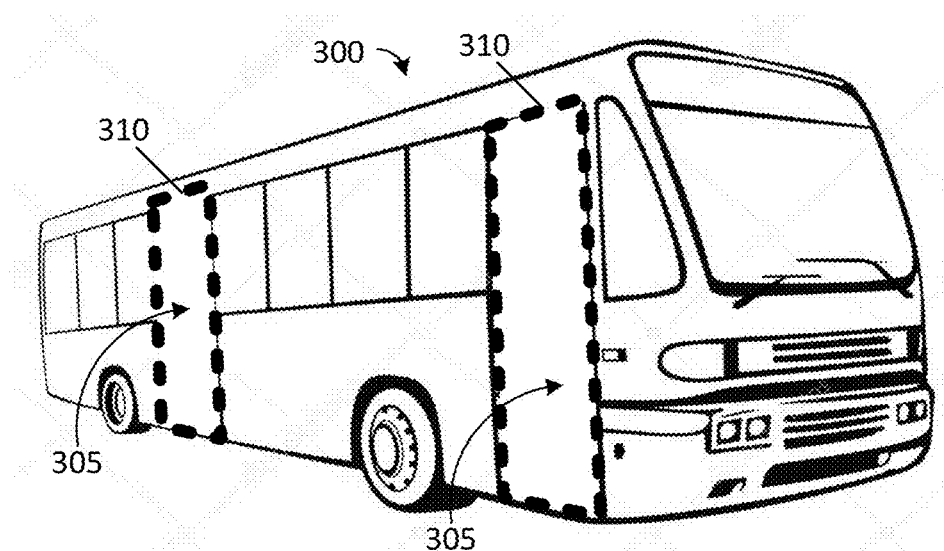
FIG. 3A depicts a rental car shuttle bus equipped with an exemplary embodiments of detection portals at both doors, according to certain aspects of the present disclosure.

FIG. 3A depicts a rental car shuttle bus 300 equipped with an exemplary embodiments of detection portals 310 at both doors 305, according to certain aspects of the present disclosure. At airports, customers will take a shuttle bus 300 from the drop-off area at the car rental facility to the airport gate where they will catch their flight. A detection portal 310 at the door 305 will be able to detect a tagged car key 200 as the customers enter the shuttle bus 300. In certain embodiments, detection portals 310 are coupled to the shuttle bus 300 proximate to both doors 305. In certain embodiments, customer ingress to the bus at the drop-off area is limited to a single door 305, for example the rear door 305, and a detection portal 310 is proximate to that door 305.

Figure 3B:
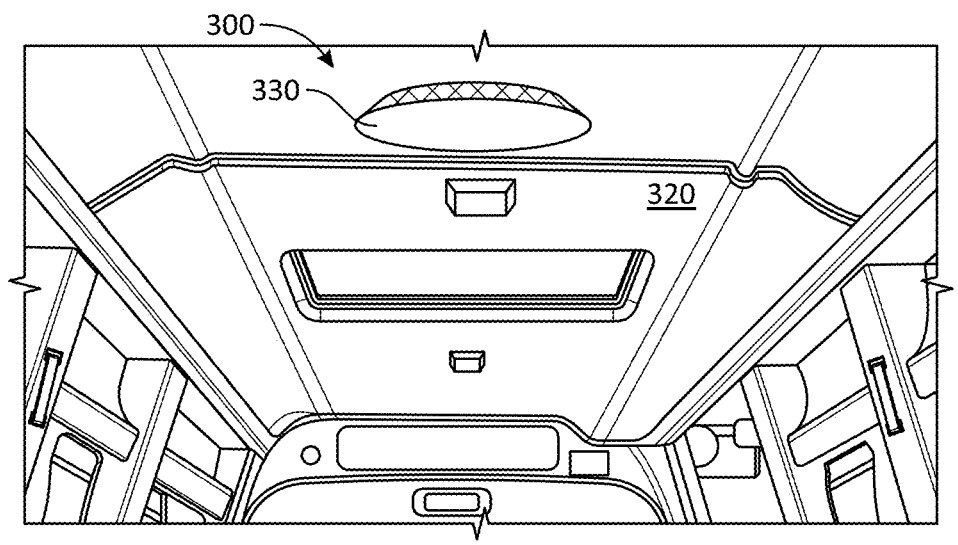
FIG. 3B depicts an embodiment of a detection portal as a fixed device attached to the ceiling of a shuttle bus, according to certain aspects of the present disclosure.

FIG. 3B depicts an embodiment of a detection portal 330 as a fixed device attached to the ceiling 320 of a shuttle bus 300, according to certain aspects of the present disclosure. In certain embodiments, the detection portal 330 has a zone of coverage that includes the entire interior of the bus 300. In certain embodiments, the detection portal 330 has a zone of coverage that includes a portion of the interior of the bus 300, for example including the door 305 (not visible in FIG. 3B).

FIG. 4A depicts an exemplary monitor 410 disposed proximate to a shuttle bus driver's seat 402, according to certain aspects of the present disclosure. In an aspect, the detection portal 310 comprises a first wireless communication module and broadcasts a signal via the wireless communication module. The monitor 410 comprises a second wireless communication module that is configured to receive the signal from the first wireless communication module. In an aspect, these are wireless ethernet modules that communicate over a local wireless network. In an aspect, these are Bluetooth modules that communicate directly. In an aspect, the wireless communication modules may utilize any optical, radio frequency, or other communication technology to transfer a signal between the detection portal 310 and the monitor 410.

The driver's area 400 of a shuttle bus commonly includes equipment for driving the bus, opening and closing doors, making announcements, and other tasks associated with managing the customers while transporting them between locations. In an aspect, the monitor 410 includes one or more of a visible and an audible alert to notify the driver, or other staff member, than a customer has carried a tagged car key 200 onto the shuttle bus 300. An audible alert may include a tone, a melody, or a spoken statement in one or more languages. In an aspect, the audible alert may be issued over a public address system within the shuttle bus 300. The driver can then ask customers to check their purses and pockets for car keys. In certain embodiments, the monitor 410 may provide an indication of the location of the tagged car key 200 within the bus 300.

In certain embodiments, different RFID codes, or identifiers, may be assigned to different car rental companies. At airports that use shuttle buses to simultaneously transport customers from multiple car rental companies, the system may provide a different alert to the driver, who can then ask the customers who rented from a particular car rental company whether they have keys with them. In certain embodiments, a different announcement may be made over the public address system, identifying the car rental company whose keys have been detected. In certain embodiments, information related to detection of keys may be provided individually to different companies, depending on the identifier of the RFID tag detected.

In certain embodiments, a monitor 410 is integral to the detection portal 310, such that an alert can be issued at the door 305 immediately upon detection of a tagged car key 200. This may provide a more confident identification of the customer carrying the tagged car key 200.

In certain embodiments, a monitor 410 is located in an office at the car rental facility, such that a staff member can contact the driver immediately to have the driver retrieve the tagged car key 200.

In certain embodiments, a monitor 410 is located at a remote location, for example the airport unloading stop, such that a staff member can retrieve the tagged car key 200 before the customer enters the airport.

FIG. 4B depicts an embodiment of a monitor as a pager 430 or other dedicated communication device, according to certain aspects of the present disclosure. This pager 430 may be carried by the driver or other staff member on the bus 300 or at the car rental facility.

FIG. 4C depicts an embodiment of a monitor as a mobile phone 440 or other general-purpose communication device, according to certain aspects of the present disclosure. In an aspect, the monitor comprises an application installed on the phone 440. In an aspect, the monitor comprises an application running on a remote server, or equivalent central communication hub, that serves as communication link between the detection portal 310 and the monitor 440. In an aspect, the server-based application may compile information related to signals from one or more detection portals 310.

Figure 5A:
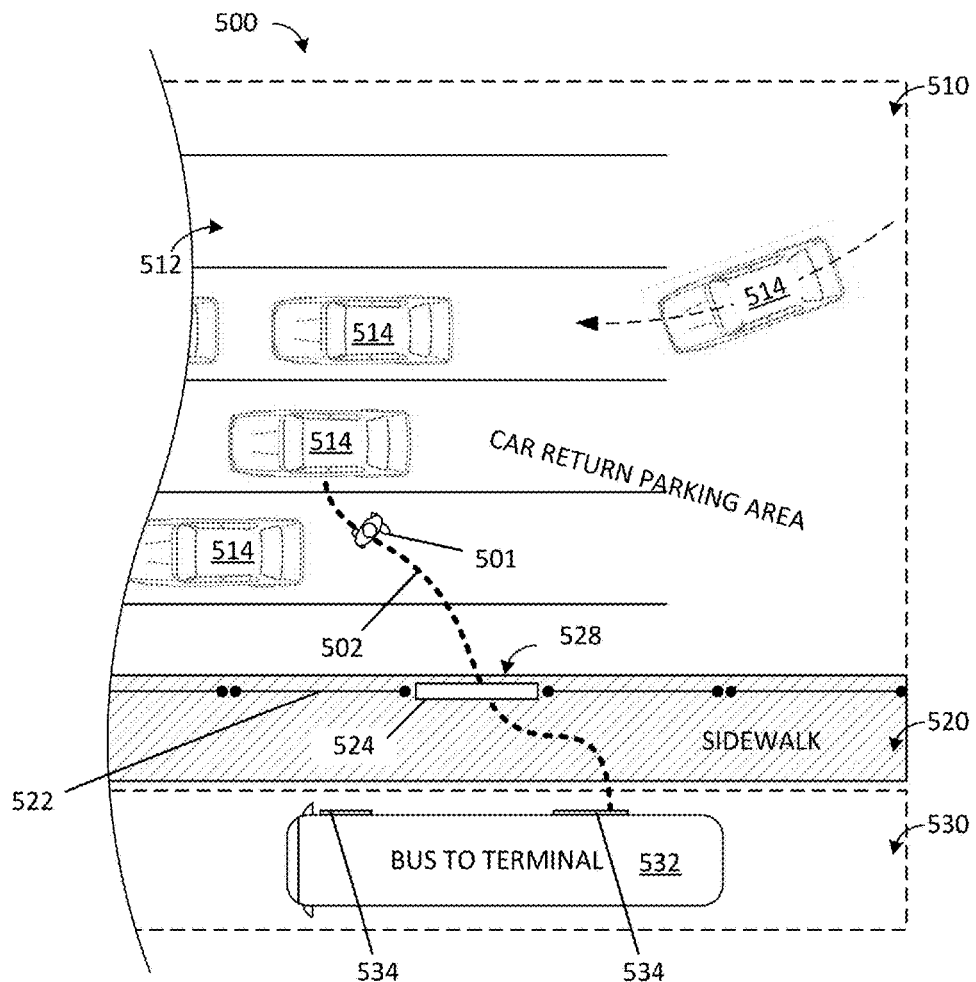
FIG. 5A is a plan view of a portion of a drop-off area at a rental car return return facility, according to certain aspects of the present disclosure.

FIG. 5A is a plan view of a portion of a drop-off area 510 at a rental car return facility 500, according to certain aspects of the present disclosure. In an example facility 500, cars 514 that are being returned after a rental are driven into one of the lanes 512, where the cars 514 are parked. After checking the car in with a staff member of the rental company or using an automated return system, a customer 501 removes their possessions from the car 514 and travel generally along the dashed-line path 502 to the shuttle bus 532 that is parked in the defined pick-up area 530. In this example, a barrier 522 is positioned along an edge of sidewalk 520 with an opening 528. A detection portal 524 is positioned at the opening 528 such that customer 501 must pass through the detection portal 524 to reach the shuttle bus 532 and enter the bus 532 through one of doors 534. As car keys should never reach the sidewalk, detection of a tagged car key 200 at the sidewalk is an indication that a company staff member should take action to retrieve the tagged car key 200.

In certain embodiments, the rental car return facility 500 is integral with other portions of the facility, such as the pick-up area for new rentals, and detection portals may be placed at other locations that customers will pass through but that car keys are not taken in normal operation.

A system for use at a rental car facility 500 would include a plurality of tagged rental car keys 200, preferably having a RFID tag 220 attached to the key for each car in use at the rental car facility. In this invention, all of the RFID tags have a common identifier, which eliminates the work and challenge of keeping track of which RFID tag is associated with each car. It doesn't matter what tagged car key 200 is detected leaving the facility, the tagged car key 200 needs to be retrieved. The system also includes detection portals that, in certain embodiments, are placed at the customer-usable door of every shuttle bus that transports customers who have returned rental cars so that a rental car key that has been retained by a customer will be detected before the tagged car key leaves the rental car return facility. Monitors are placed at one or more locations, such as a mobile phone carried by the driver, in the shuttle bus so as to notify the driver to retrieve a set of tagged car keys before departing the rental car return facility.

Figure 5B:
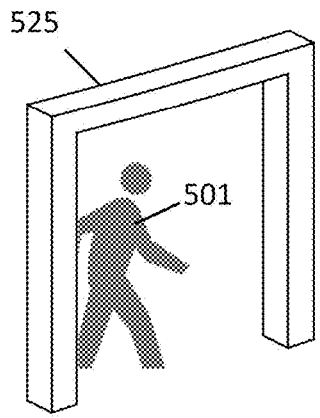
FIGS. 5B-5D depicts embodiments of detection portals, according to certain aspects of the present disclosure.
Figure 5C:
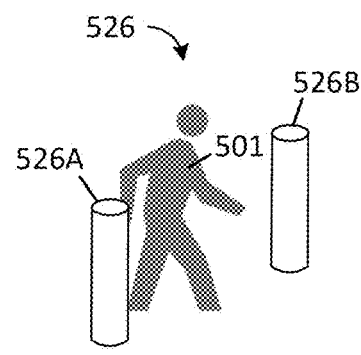
Figure 5D:
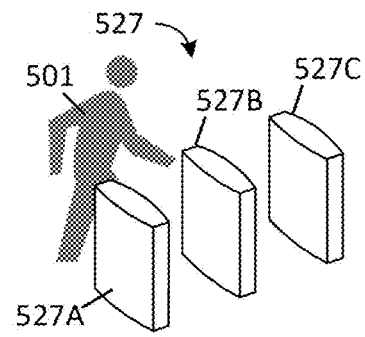

FIGS. 5B-5D depicts embodiments of detection portals, according to certain aspects of the present disclosure. FIG. 5B is a "door frame" detection portal 525 through which a customer must pass. The detection portal 525 may interact with a RFID tag 220 while the tagged car key 200 is passing through the door frame or within a defined distance of the door frame.

FIG. 5C depicts the detection portal embodied as one or more posts 526 spaced apart such that the zone of coverage of post 526A overlaps with the zone of coverage of post 526B, ensuring that a customer will pass within a zone of coverage of at least one detection portal 526.

FIG. 5D depicts the detection portal embodied as one or more turnstiles 527 spaced apart such that the zone of coverage of turnstile 527A overlaps the zone of cover of turnstile 527B, ands likewise the zones of coverage of turnstiles 527B and 527C overlap. This ensures that a customer passing between the turnstiles will pass within a zone of coverage of at least one detection portal 527. In an aspect, turnstile 527 may include a motion control element such as a movable bar or plate (not shown in FIG. 5D) to control movement between the turnstiles 527.

Figure 6A:
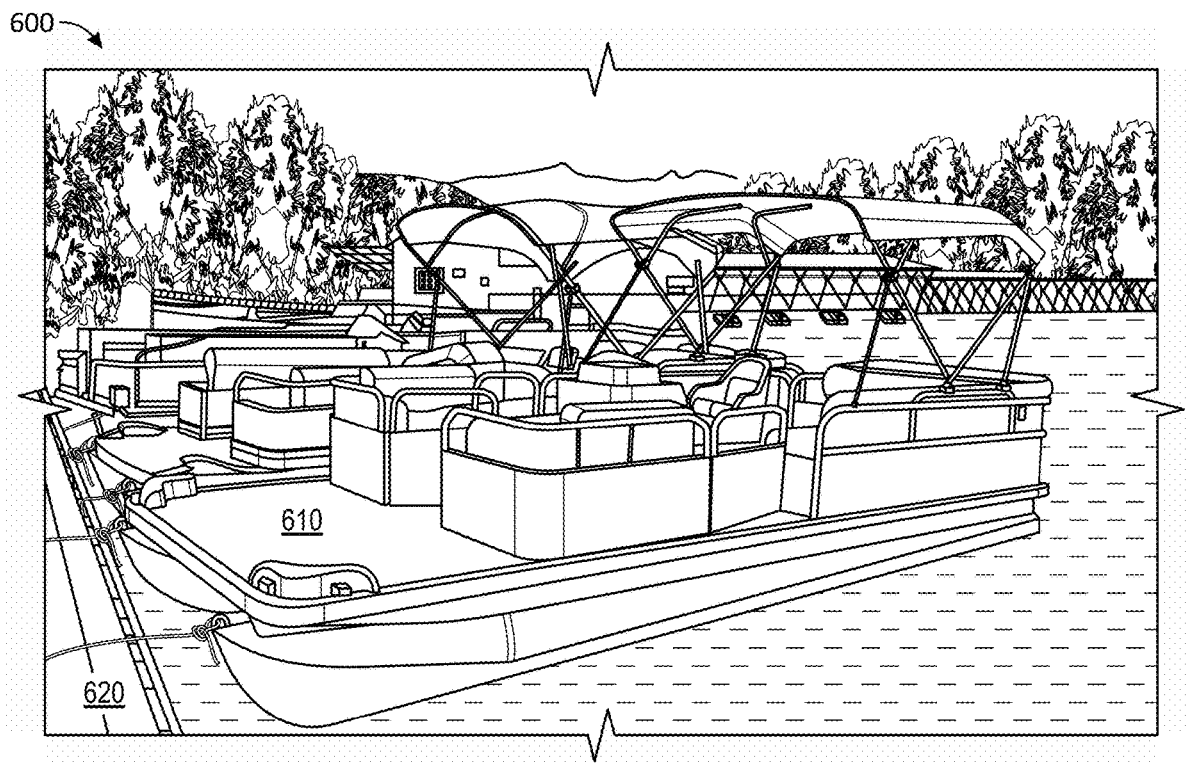
FIGS. 6A-6B depict use of the disclosed invention at a boat rental facility, according to certain aspects of the present disclosure.
Figure 6B:
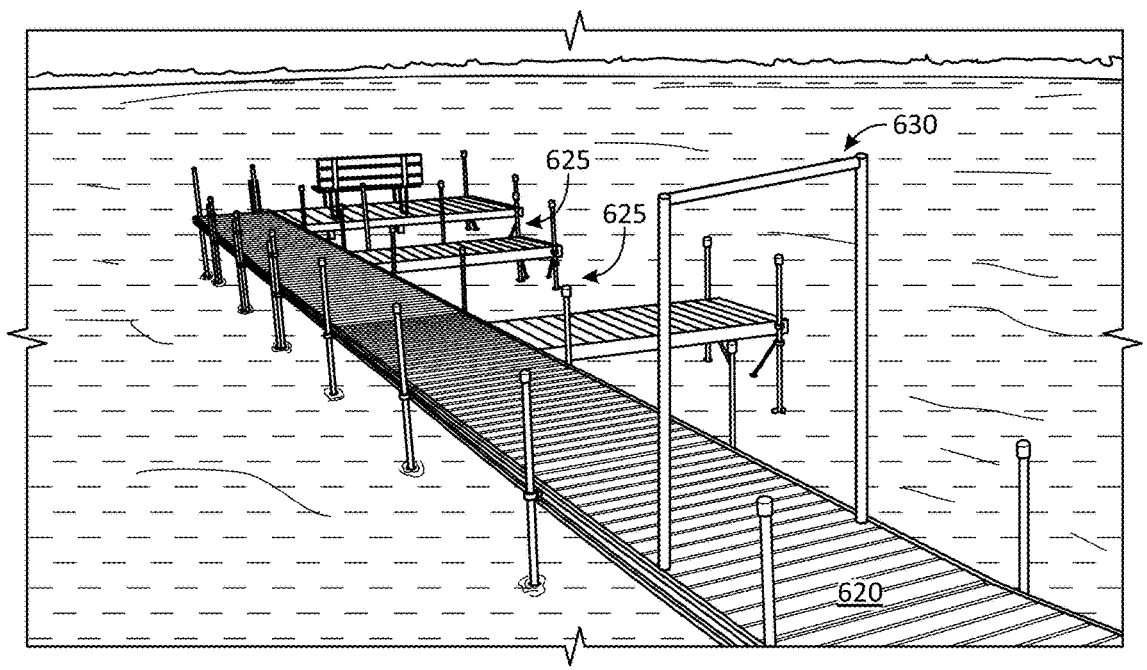

FIGS. 6A-6B depict use of the disclosed invention at a boat rental facility 600, according to certain aspects of the present disclosure. In certain arrangements, rental boats 610 use keys to enable the motor, much like a car. The rental company needs to retain the boat key after a customer returns the boat 610 to the dock 620.

FIG. 6B depicts an example detection portal 630 positioned on a dock 620 such that customer must pass through the detection portal 630 to reach the shore after returning a boat (not shown in FIG. 6B) to one of the boat slips 625.

Figure 7A:
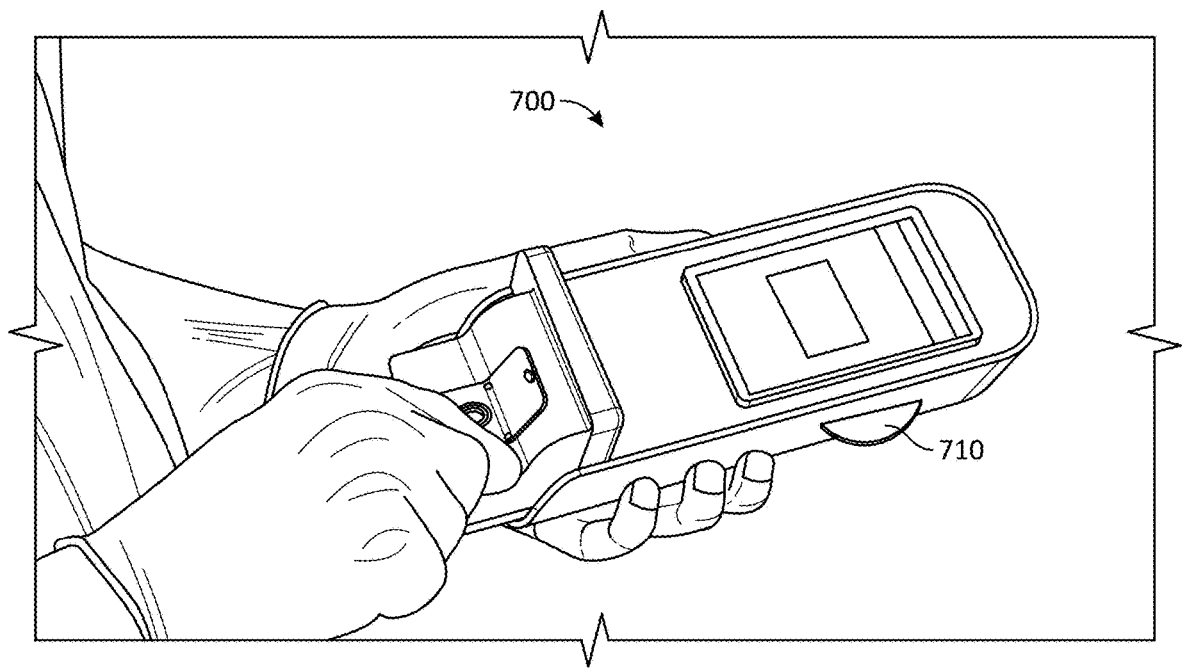
FIG. 7A depicts an exemplary portable device that should be retained in a facility, according to certain aspects of the present disclosure.

FIG. 7A depicts an exemplary portable device 700 that should be retained in a facility, according to certain aspects of the present disclosure. In this example, device 700 is a portable medical scanner to which a RFID tag 710 has been attached. In an aspect, the device 700 could be any portable item such as an infusion pump, a medical cart, or a bed. For example, the device could be a static object such as a chair or vase, or a functional object such as a computer, projector, or projection screen. In an aspect, use of a plurality of RFID tags having a common identifier provides the ability for the system to flag that an item has entered an area where it should not be, or is passing through a portal as it leaves an intended area of use, without identifying the specific item.

Figure 7B:
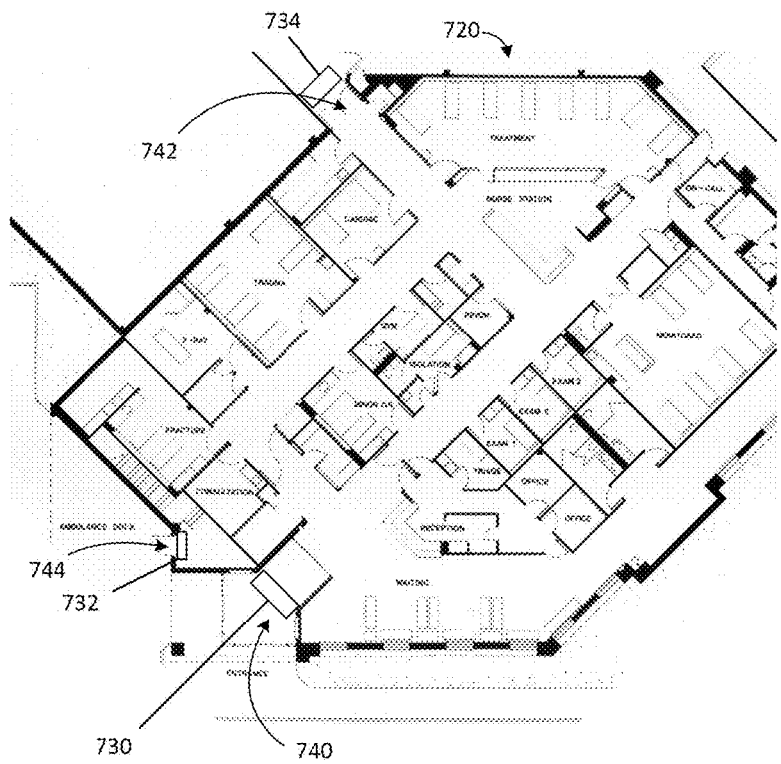
FIG. 7B depicts a floorplan of an example facility using the disclosed invention, according to certain aspects of the present disclosure.

FIG. 7B depicts a floorplan of an example facility 720 using the disclosed invention, according to certain aspects of the present disclosure. Exemplary facilities that are concerned with retaining portable instruments include hospitals. In this example, a detection portal 730 is installed at an egress point of the facility, for example the main entrance 740. In an aspect, the detection portal 730 is configured, e.g. has sufficient radio frequency (RF) power and an antenna design and circuitry that is sensitive to the effects of the RFID tag on the field emitted by the antenna, to detect any RFID tag that passes through the egress point. A detection portal 732 is installed at external side door 744. A detection portal 734 is installed at internal door 742 that leads, in this example, into a hallway to other parts of the facility. All devices that should remain within the area defined by the boundary set by detection portals 730, 732, 734 can be tagged with the RFID tags of this invention to provide an alert when any of the tagged devices pass outside the defined area.

The disclosed system is inventive over current RFID systems in that every RFID tag has a common identifier. The disclosed detection portal, or other RFID reader, cannot distinguish between RFID tags having a common identifier. In an aspect, the common identifier is implemented as an electrical circuit that produces a detectable effect on an electromagnetic field generated by an RFID reader. In an aspect, the common identifier is implemented as a digital character string that is stored in the RFID tag and provided to the RFID reader via interaction with the electromagnetic field generated by an RFID reader. RFID tags that use a common identifier do not need to be individually programmed. This simplifies the production process, which reduces the purchase cost of the RFID tag. RFID tags that use a common identifier do not need to be individually associated with a specific tagged object. This simplifies the deployment process, which eliminates the cost of the time that it would take to scan each RFID tag and associate it with an individual tagged object.

The detection portals are also simplified in design and construction, and therefore in cost, as there is no attempt to determine where the RFID tag is located or limit the coverage of the detection portal to a strictly defined area. The detection portals need only be well away from the area where the rental cars are parked to be effective.

As used in this disclosure, the phrase "common identifier" includes the concept wherein each RFID tag comprises an identifier that is a member of a set of identifiers, wherein the number of identifiers in the set is smaller than the number of RFID tags in use at a facility. For example, a first group of RFID tags may be purchased from a first supplier and delivered with a first identifier and a second group of RFID tags may be purchased from a second supplier and delivered with a second identifier that is not the same as the first identifier. In certain embodiments, the first and second groups of RFID tags may be purchased from the same supplier at different times. When the second group of RFID tags are put into use at a facility already using at least some of the first group of RFID tags, the second identifier is added to the memory of the detection portals at the facility in addition to the first identifier. In certain embodiments, the system will react identically to the presence of either the first or the second identifier. In certain embodiments, the system will react differently to the presence of the first identifier and the second identifier, although not differentiating between items having one of the first RFID tags and not differentiating between items having one of the second RFID tags. In some embodiments, the number of RFID tags in use is at least 5× the number of different identifiers in the set. In some embodiments, the number of RFID tags in use is at least 10× the number of different identifiers in the set. In some embodiments, the number of RFID tags in use is at least 100× the number of different identifiers in the set. In some embodiments, at least two of the RFID tags have a common identifier.

All structural and functional equivalents to the elements of the various aspects described throughout this disclosure are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

This application includes description that is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Although embodiments of the present disclosure have been described and illustrated in detail, it is to be clearly understood that the same is by way of illustration and example only and is not to be taken by way of limitation, the scope of the present invention being limited only by the terms of the appended claims.

We claim:

1. An apparatus for recovering a vehicle key that has been retained by a customer after returning a rental vehicle, comprising: a Radio Frequency IDentification (RFID) tag that is attached to the vehicle key associated with the returned rental vehicle; and a detection portal disposed at a location remote from the returned rental vehicle and having a zone of coverage that does not include any rental vehicle, the portal configured to detect the RFID tag when the RFID tag is within the zone of coverage and provide a signal when the RFID tag is detected, wherein the detection portal is disposed at a location outside of a drop off area of a rental vehicle return facility such that the customer must pass through the zone of coverage in order to exit the drop off area.

2. The apparatus of claim 1, wherein the detection portal is disposed on a shuttle bus.

3. The apparatus of claim 2, wherein—the detection portal is disposed proximate to a door of the shuttle bus such that the customer must pass through the zone of coverage to enter the shuttle bus.

4. The apparatus of claim 2, further comprising a monitor configured to receive the signal and, upon receipt of the signal, provide an alert to a driver of the shuttle bus, thereby enabling the driver to recover the retained vehicle key from the customer.

5. The apparatus of claim 4, wherein the signal comprises a name of a rental company, thereby enabling the driver to ask customers of the rental company to check for the retained vehicle key.

6. The apparatus of claim 4, wherein the signal comprises a location of the vehicle key within the shuttle bus, thereby enabling the driver to ask customers proximate to the location to check for the retained vehicle key.

7. A method of recovering a vehicle key retained by a customer after returning a rental vehicle, the method comprising the steps of: attaching a Radio Frequency IDentification (RFID) tag to the vehicle key; and operating a detection portal disposed at a location remote from the returned rental vehicle and having a zone of coverage that does not include any rental vehicle, wherein the detection portal is configured to detect the RFID tag when the RFID tag is within the zone of coverage and, upon such detection, provide a signal, wherein the detection portal is disposed at a location outside of a drop off area of a rental vehicle return facility such that the customer must pass through the zone of coverage in order to exit the drop off area.

8. The method of claim 7, wherein the detection portal is disposed on a shuttle bus.

9. The method of claim 8, wherein—the detection portal is disposed proximate to a door of the shuttle bus such that the customer must pass through the zone of coverage to enter the shuttle bus.

10. The method of claim 8, further comprising the step of: receiving the signal and, upon receipt of the signal, providing an alert to a driver of the shuttle bus, thereby enabling the driver to recover the retained vehicle key from the customer.

11. The method of claim 10, wherein the signal comprises a name of a rental company, thereby enabling the driver to ask customers of the rental company to check for the retained vehicle key.

12. The method of claim 10, wherein the signal comprises a location of the vehicle key within the shuttle bus, thereby enabling the driver to ask customers proximate to the location to check for the retained vehicle key.

* * * * *